March 6, 1951  R. W. LEMM  2,543,977
BAIL TYPE CLOSURE FASTENING MEANS
Filed July 2, 1947
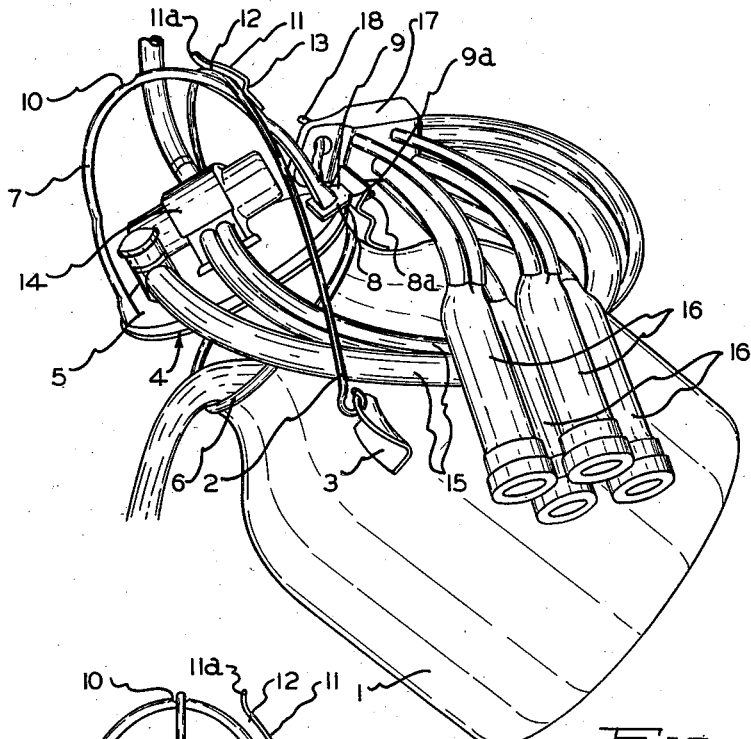
FIG. I.
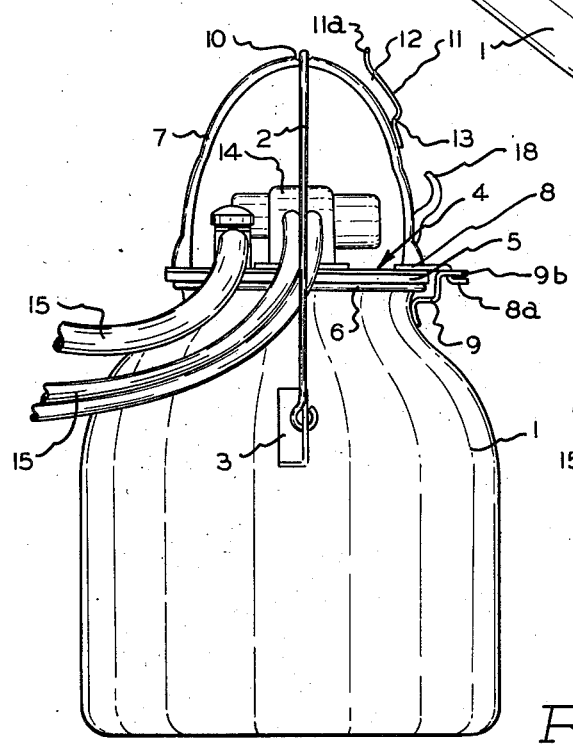
FIG. II.
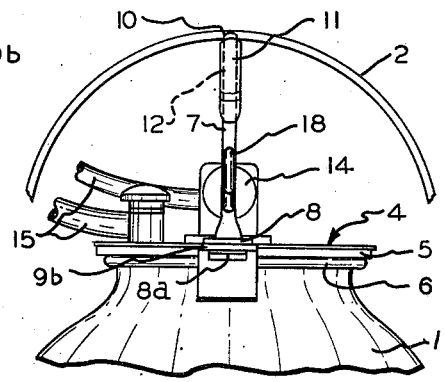
FIG. III.
Inventor
ROBERT W. LEMM
By Beaman & Patch
Attorneys Patented Mar. 6, 1951

2,543,977

UNITED STATES PATENT OFFICE 2,543,977

BAIL TYPE CLOSURE FASTENING MEANS

Robert W. Lemm, Grass Lake, Mich.

Application July 2, 1947, Serial No. 758,571

5 Claims. (Cl. 220—56)

This invention relates to milking machines of the kind which employ a pail having a lifting and carrying bail and a cover carrying the usual milking means for operative connection with a cow and with a main power means or suction or air line for milking the cow into the pail while the mouth of the latter is closed by the cover, the latter being fitted with an upstanding lifting handle over which the bail is capable of being swung, when the cover is closed upon the pail mouth.

The object of the present invention is to provide an improved such pail and cover construction which is easier to handle and with which the operation of pouring the milk from the pail is also capable of being effected in a simple and efficient manner.

Other objects of the invention will appear clear from a consideration of the following description with reference to the drawings in which:

Fig. 1 is a perspective elevational view of one form of apparatus in accordance with the invention shown in pouring position, with the cover held open, Fig. 2 is an elevational view of the apparatus as seen in Fig. 1 but shown in the closed position, in which the cover is held closed by a snap-action fit between the bail and cover handle, and Fig. 3 is a fragmentary view of the top part of the apparatus, looking upon the right-hand side of the cover handle.

In carrying the invention into effect in one convenient manner as illustrated in the drawings, apparatus is provided consisting of a pail 1, having a bail 2 pivotally connected to the pail (as by connection to the side brackets 3) and a cover 4 which is formed with a base 5 adapted to fit over and close the pail mouth 6 and is also provided with an upstanding handle 7.

The cover is adapted to have a hinged connection with the pail and this is preferably accomplished in such manner that the cover can be completely removed from the pail when required. Thus the base of the cover may have a radially extending finger 8 which terminates in a downturned portion 8a which is capable of being passed through a central slot 9a in a bracket plate 9 on the outside of the pail so as to lie underneath the top and horizontal wall 9b of this bracket and form a hinged connection by which the cover 4 is capable of being swung open, or closed, as desired. The hinge construction is such as permits the hinged connection to be readily broken whenever it is required to disconnect the cover from the pail.

The cover handle 7 is disposed such that when the cover is in position on the pail this handle extends in a plane perpendicular to the plane of the bail 2, when the latter is disposed in the vertical position as shown in Fig. 2. Other angularly displaced positions of the handle and bail are, however, possible.

The cover handle 7 has a central "nick" or depression 10 and the form and arrangement of the bail and handle are such that when the cover is hingedly connected with the pail and the bail is swung into the vertical position, as shown in Fig. 2, the bail will be retained in such position by a snap-action engagement with said depression 10 until it (the bail) is deliberately forced out of the depression, which will occur when the pail is lifted by the bail.

The cover handle also carries on the side thereof adjacent the hinged connection referred to, a member 11 which forms a hook 12 closed at one end 13, adjacent the said hinged connection, and open at the opposite end for the introduction, into the hook, of the top portion of the bail. This hook is of arcuate shape, as shown, but is eccentric to the path of the swinging mvement of the bail and consequently when the latter is swung from its vertical position, as shown in Fig. 2, towards the hinged connection, it will engage the upstanding free end portion 11a of the hook forming member 11 and, by being constrained to enter the hook during further swinging movement of the bail in such direction, will result in an outward force being applied to the cover 4, such as will automatically produce an opening movement thereof, as is illustrated in Fig. 1. In this position of the cover, therefore, it is possible to pour from the pail while the interior of the pail is still substantially covered from above by the presence of the overlying cover, as clearly shown in Fig. 1.

The cover carries the usual pulsator head 14 and tubes 15 and also the teat cups 16, ganged upon a unit 17 which is capable of being hung onto a claw 18 on the cover handle during the pouring operation, or when it is desired to carry the pail about.

Having thus described my invention, what I claim as new and desire to cover by Letters Patent is:

1. In combination, a pail or like vessel having an open pouring mouth end, a bail pivotally mounted on said vessel, a movable closure member mounted on said vessel in position to close said pouring mouth, a fixed upstanding handle on said closure member, said fixed handle and said bail being positioned with their planes substantially perpendicular with respect to each other and said bail being swingable over said fixed handle, and abutment means on said fixed handle disposed in the path of swinging movement of the bail in one direction relatively to the vessel, said abutment means being adapted to constrain the closure member to move to open position upon contact of said bail with said abutment means.

2. In combination, a pail or like vessel having an open pouring mouth end, a bail pivotally mounted on said vessel, a movable closure member mounted on said vessel in position to close said pouring mouth, a fixed upstanding handle on said closure member, said fixed handle and said bail being positioned with their planes substantially perpendicular with respect to each other and said bail being swingable over said fixed handle, said bail and said handle being also formed to have snap action inter-locking engagement with each other when the bail is in a raised position, and abutment means on said fixed handle disposed in the path of swinging movement of the bail in one direction relatively to the vessel, said abutment means being adapted to constrain the closure member to move to open position upon contact of said bail with said abutment means.

3. In combination, a pail or like vessel having an open pouring mouth end, a bail pivotally mounted on said vessel, a movable closure member mounted on said vessel in position to close said pouring mouth, a fixed upstanding handle on said closure member, said fixed handle and said bail being positioned with their planes substantially perpendicular with respect to each other and said bail being swingable over said fixed handle, and abutment means on said fixed handle disposed in the path of swinging movement of the bail in one direction relatively to the vessel, said abutment means being constituted by a hook on said handle eccentric to the arc of swinging movement of said bail and open to receive the bail therein when the latter is swung in the closure opening direction, whereby to constrain the closure member to move to open position by continued movement of the bail in said direction and its cammed engagement with the hook due to said eccentricity.

4. In combination, a pail or like vessel having an open pouring mouth end, a bail pivotally mounted on said vessel, a closure member pivotally mounted on said vessel in position to close said pouring mouth, the plane of swing of said closure member being in the same direction as the plane of swing of said pail, a fixed upstanding handle on said closure member, said fixed handle and said bail being positioned with their planes substantially perpendicular with respect to each other and said bail being swingable over said fixed handle, and hook shape abutment means on said fixed handle having the opening thereto disposed in the path of swinging movement of the bail relatively to the vessel and in a direction towards the pivotal mounting of said closure member, said hook being eccentric to the arc of movement of said bail, whereby the closure member is constrained to swing open by the engagement of the bail in said hook in the continued swinging movement of the bail in said direction.

5. In combination, a pail or like vessel having an open pouring mouth end, a bail pivotally mounted on said vessel, a closure member pivotally mounted on said vessel and adapted to close said pouring mouth, the plane of swing of said closure member being in the same direction as the plane of swing of said pail, a fixed upstanding handle on said closure member, said fixed handle and said bail being positioned with their planes substantially perpendicular with respect to each other and said bail being swingable over said fixed handle, said bail and said handle being also formed to have snap action inter-locking engagement with each other when the bail is in a raised position, and abutment means on said fixed handle disposed in the path of swinging movement of the bail relatively to the vessel in a direction towards the pivoted mounting of said closure member, said abutment means being adapted to constrain the closure member to move to open position upon contact of said bail with said abutment means in the swinging movement of the bail in said direction.

ROBERT W. LEMM.

REFERENCES CITED

The following references are of record in the file of this patent:

UNITED STATES PATENTS

| Number | Name | Date |
|---|---|---|
| 700,764 | Hardy | May 27, 1902 |
| 1,119,619 | Lusk | Dec. 1, 1914 |
| 1,353,127 | Ferdon | Sept. 14, 1920 |